(12) United States Patent  
Vaccaro

(10) Patent No.: US 10,948,107 B2
(45) Date of Patent: Mar. 16, 2021

(54) HANGER FOR MOUNTING CABLES

(71) Applicant: CommScope Technologies LLC, Hickory, NC (US)

(72) Inventor: Ronald A. Vaccaro, Shorewood, IL (US)

(73) Assignee: CommScope Technologies LLC, Hickory, NC (US)

( * ) Notice: Subject to any disclaimer, the term of this patent is extended or adjusted under 35 U.S.C. 154(b) by 505 days.

(21) Appl. No.: 15/278,339

(22) Filed: Sep. 28, 2016

(65) Prior Publication Data

US 2017/0122463 A1 May 4, 2017

Related U.S. Application Data

(60) Provisional application No. 62/248,465, filed on Oct. 30, 2015.

(51) Int. Cl.
*F16L 3/223* (2006.01)
*H02G 3/32* (2006.01)
*F16L 3/10* (2006.01)
*H02G 3/04* (2006.01)

(52) U.S. Cl.
CPC ............ *F16L 3/223* (2013.01); *F16L 3/1075* (2013.01); *H02G 3/04* (2013.01); *H02G 3/32* (2013.01)

(58) Field of Classification Search
CPC .......... F16M 3/1075; F16L 3/223; F16L 3/04; F16L 3/10; F16L 3/1033; F16L 3/1041; F16L 3/1091
USPC .................................................. 248/49–74.5
See application file for complete search history.

(56) References Cited

U.S. PATENT DOCUMENTS

| 3,728,761 A * | 4/1973 | Holly | F16B 37/043 411/80.1 |
| 4,085,651 A * | 4/1978 | Koscik | F16B 19/1081 411/41 |
| 4,317,262 A * | 3/1982 | Wells, Jr. | F16L 3/12 24/16 PB |
| 4,405,272 A * | 9/1983 | Wollar | F16B 19/1081 411/41 |

(Continued)

FOREIGN PATENT DOCUMENTS

| CN | 1697276 | 11/2005 |
| JP | 2012-222986 | 11/2012 |

OTHER PUBLICATIONS

Notification of Transmittal of the International Search Report and the Written Opinion of the International Searching Authority, or the Declaration for corresponding PCT Application No. PCT/US2016/054361, dated Jan. 9, 2017, 14 pages.

(Continued)

*Primary Examiner* — Christopher Garft
(74) *Attorney, Agent, or Firm* — Myers Bigel, P.A.

(57) ABSTRACT

A cable hanger includes: a first half including a main body with a first cable recess, a latch adapted for mounting to a mounting structure, and a first securing feature; and a second half including a main body with a second cable recess, a bore adapted for receiving the latch of a second cable hanger, and a second securing feature. The first half is mated with the second half such that the first and second cable recesses form a pocket for receiving and grasping a cable. The first and second securing features engage to maintain the first half and the second half in a mated condition.

10 Claims, 5 Drawing Sheets

(56) References Cited

U.S. PATENT DOCUMENTS

| | | | | |
|---|---|---|---|---|
| 5,002,243 A * | 3/1991 | Kraus | ............ | B60R 16/08 |
| | | | | 248/68.1 |
| 5,113,717 A | 5/1992 | Plamper | | |
| 5,393,021 A * | 2/1995 | Nelson | ............ | F16L 3/127 |
| | | | | 248/71 |
| 5,409,336 A * | 4/1995 | Jericevich | ............ | A47H 1/10 |
| | | | | 411/41 |
| 5,669,590 A | 9/1997 | Przewodek | | |
| 5,704,572 A * | 1/1998 | Vogel | ............ | F16L 3/2235 |
| | | | | 248/65 |
| 5,775,860 A * | 7/1998 | Meyer | ............ | F16B 19/1081 |
| | | | | 411/41 |
| 6,074,144 A * | 6/2000 | Meyer | ............ | F16B 19/1081 |
| | | | | 411/41 |
| 6,206,330 B1 * | 3/2001 | Oi | ............ | F16B 37/0842 |
| | | | | 248/635 |
| 6,315,250 B1 * | 11/2001 | Meyer | ............ | B29C 45/0017 |
| | | | | 248/544 |
| 6,354,543 B1 * | 3/2002 | Paske | ............ | F16L 3/12 |
| | | | | 211/85.18 |
| 6,899,304 B2 | 5/2005 | Bellmore | | |
| 7,484,698 B2 | 2/2009 | Budagher | | |
| 8,011,621 B2 * | 9/2011 | Korczak | ............ | F16L 3/127 |
| | | | | 248/68.1 |
| 8,191,836 B2 | 6/2012 | Korczak | | |
| 8,353,485 B2 | 1/2013 | Hjerpe | | |
| 8,439,316 B2 | 5/2013 | Feige | | |
| 8,672,276 B2 * | 3/2014 | Fukumoto | ............ | F16L 3/237 |
| | | | | 248/67.5 |
| 9,306,380 B2 | 4/2016 | Vaccaro | | |
| 2002/0005463 A1 | 1/2002 | Paske | | |
| 2005/0109890 A1 * | 5/2005 | Korczak | ............ | F16L 3/12 |
| | | | | 248/74.1 |
| 2005/0220561 A1 * | 10/2005 | Okada | ............ | F16B 19/1081 |
| | | | | 411/41 |
| 2005/0247829 A1 | 11/2005 | Low et al. | | |
| 2007/0018057 A1 * | 1/2007 | Kovac | ............ | F16L 3/1025 |
| | | | | 248/68.1 |
| 2007/0246614 A1 * | 10/2007 | Allmann | ............ | F16L 3/237 |
| | | | | 248/65 |
| 2007/0246616 A1 | 10/2007 | Budagher | | |
| 2009/0230256 A1 | 9/2009 | Widlacki et al. | | |
| 2009/0314903 A1 | 12/2009 | Zahuranec et al. | | |
| 2010/0000763 A1 | 1/2010 | Stansberry, Jr. | | |
| 2011/0283515 A1 * | 11/2011 | Korczak | ............ | F16L 3/127 |
| | | | | 29/446 |
| 2013/0240684 A1 * | 9/2013 | Meyers | ............ | F16L 3/237 |
| | | | | 248/74.1 |
| 2014/0091182 A1 * | 4/2014 | Fukumoto | ............ | F16L 3/2235 |
| | | | | 248/68.1 |

OTHER PUBLICATIONS

International Search Report and Written Opinion for corresponding PCT Application No. PCT/US2016/023939, dated Aug. 24, 2016, 11 pages.
Notification Concerning Transmittal of International Preliminary Report on Patentability for corresponding PCT Application No. PCT/US2016/054361, dated May 11, 2018.
Examination Report corresponding to European Application No. 16860476.7 dated Feb. 4, 2020.
Extended European Search Report corresponding to European Application No. 16860476.7 dated Mar. 28, 2019.
Office Action corresponding to Chinese Application No. 201683056034.8 dated Apr. 25, 2019.

* cited by examiner

HANGER FOR MOUNTING CABLES

RELATED APPLICATION

This application claims priority from and the benefit of U.S. Provisional Patent Application No. 62/248,465, filed Oct. 30, 2015, the disclosure of which is hereby incorporated herein in its entirety.

FIELD OF THE INVENTION

This invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. Hangers can be "stacked" onto each other by inserting the locking projections of one hanger into the large aperture of the next hanger.

One variety of cable hanger of this type is the SNAP-STAK® hanger, available from CommScope, Inc. (Joliet, Ill.). The SNAP-STAK® hanger is offered in multiple sizes that correspond to the outer diameters of different cables. This arrangement has been suitable for use with coaxial RF cables, which tend to be manufactured in only a few different outer diameters; however, the arrangement has been less desirable for fiber optic cables, which tend to be manufactured in a much greater variety of diameters. Moreover, fiber optic cables tend to be much heavier than coaxial cables (sometimes as much as three times heavier per unit foot), which induces greater load and stress on the hangers.

SUMMARY

As a first aspect, embodiments of the invention are directed to a cable hanger, comprising: a first half including a main body with a first cable recess, a latch adapted for mounting to a mounting structure, and a first securing feature; and a second half including a main body with a second cable recess, a bore adapted for receiving the latch of a second cable hanger, and a second securing feature. The first half is mated with the second half such that the first and second cable recesses form a pocket for receiving and grasping a cable. The first and second securing features engage to maintain the first half and the second half in a mated condition.

As a second aspect, embodiments of the invention are directed to a cable hanger, comprising: a first half including a main body with a first cable recess, a latch adapted for mounting to a mounting structure, and a first securing feature; and a second half including a main body with a second cable recess, a bore adapted for receiving the latch of a second cable hanger, and a second securing feature. The first half is mated with the second half such that the first and second cable recesses form a pocket for receiving and grasping a cable. The first and second securing features engage to maintain the first half and the second half in a mated condition. The first half and the second half are connected via a hinge. The main body of the first half includes a bore that is coaxial with the latch. The cable hanger further comprises a plunger, the plunger configured to reside in the bore of the first half and maintain the latch in a latched condition. The plunger is attached to the first half within the bore of the first half.

As a third aspect, embodiments of the invention are directed to a cable hanger, comprising: a first half including a main body with a first cable recess, a latch adapted for mounting to a mounting structure, and a first securing feature; and a second half including a main body with a second cable recess, a bore adapted for receiving the latch of a second cable hanger, and a second securing feature. The first half is mated with the second half such that the first and second cable recesses form a pocket for receiving and grasping a cable. The first and second securing features engage to maintain the first half and the second half in a mated condition. The cable hanger is a monolithic component formed of a polymeric material, and the first and second halves are connected via a living hinge.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
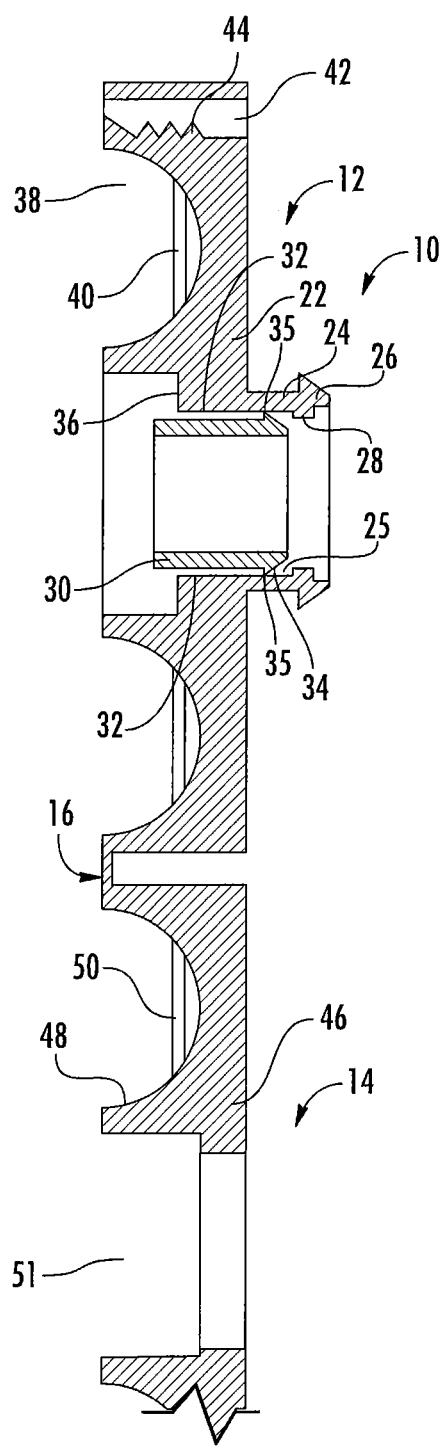
FIG. 1 is a partial top view of a cable hanger according to embodiments of the invention, with the cable hanger in an open configuration.
Figure 2:
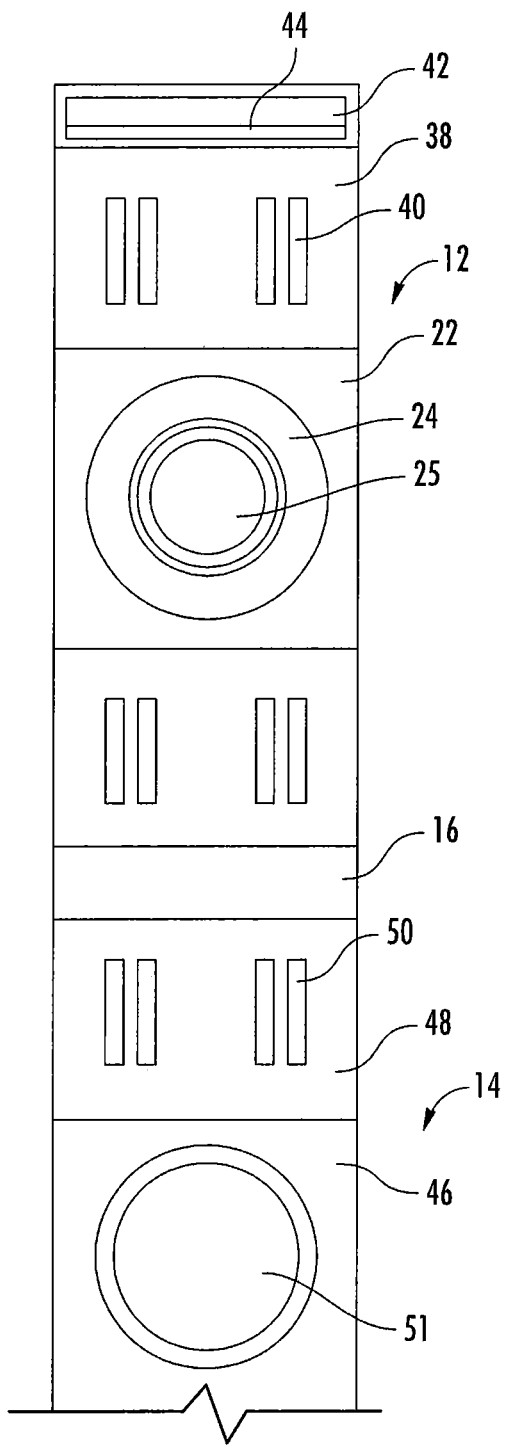
FIG. 2 is a partial front view of the cable hanger of FIG. 1 in the open position.

Referring now to the figures, a cable hanger, designated broadly at 10, is shown in FIGS. 1 and 2. The cable hanger 10 includes two halves 12, 14 that are connected at their ends by a living hinge 16. The halves 12, 14 are described below.

The half 12 (which is shown in its complete form in FIGS. 1 and 2), includes a main body 22. The main body 22 has a central bore 25 that is encircled by a split boss latch 24 that extends forwardly of the main body 22. The latch 24 has a radially-outwardly extending hook 26, and also includes a radially-inwardly extending ledge 28. A hollow cylindrical plunger 30 is attached within the bore 25 via breakaway tabs 32. The plunger 30 has an inclined bearing surface 34 at one end that forms a hook 35. A counterbore 36 is coaxial with the bore 25 opposite the latch 24.

Referring still to FIGS. 1 and 2, an arcuate cable recess 38 is located in the rear surface of the main body 22 on each side of the bore 24. Flex sections 40 extend across each cable recess 38. The flex sections 40 enable the cable hanger 10 to grasp cables of different sizes; the structure and function of various flex sections are described in U.S. Patent No. 62/139,057, filed Mar. 27, 2015, the disclosure of which is hereby incorporated herein in its entirety.

A slot 42 is located near the end of the main body 22 opposite the living hinge 16. The slot 42 has teeth 44 on its inner surface (i.e., the surface nearest the latch 24).

Referring still to FIGS. 1 and 2, the half 14 (most of which is shown in FIGS. 1 and 2) includes has a main body 46 with cable recesses 48 with flex sections 50 similar to the cable recesses 38 and flex sections 40 of the half 12. In its center, the main body 46 has a bore 51 that is sized to be similar to the outer diameter of the latch 24. At its end opposite the living hinge 16, the half 14 has a ratchet strap 52 with teeth 54 on its inward-facing surface (see FIG. 3).

The cable hanger 10 can be formed of a variety of materials, including polymeric materials such as nylon and polypropylene (in particular, materials suitable for a living hinge may be appropriate). In some embodiments, the cable hanger 10 is formed as a monolithic component.

Figure 3:
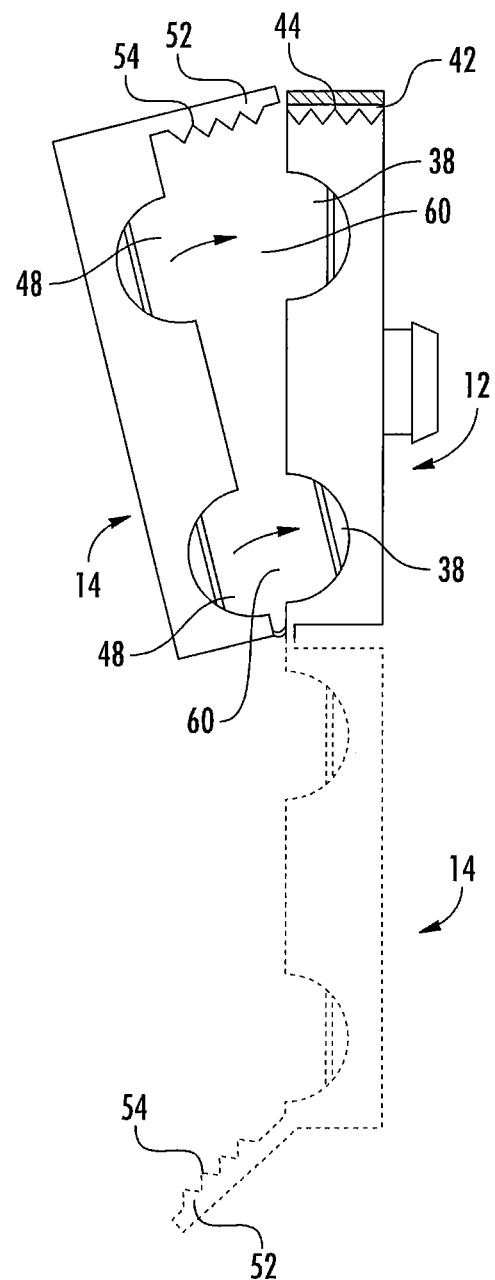
FIG. 3 is a top view of the cable hanger of FIG. 1 showing the hinging movement of the cable hanger move from the open positon to a closed position.
Figure 4:
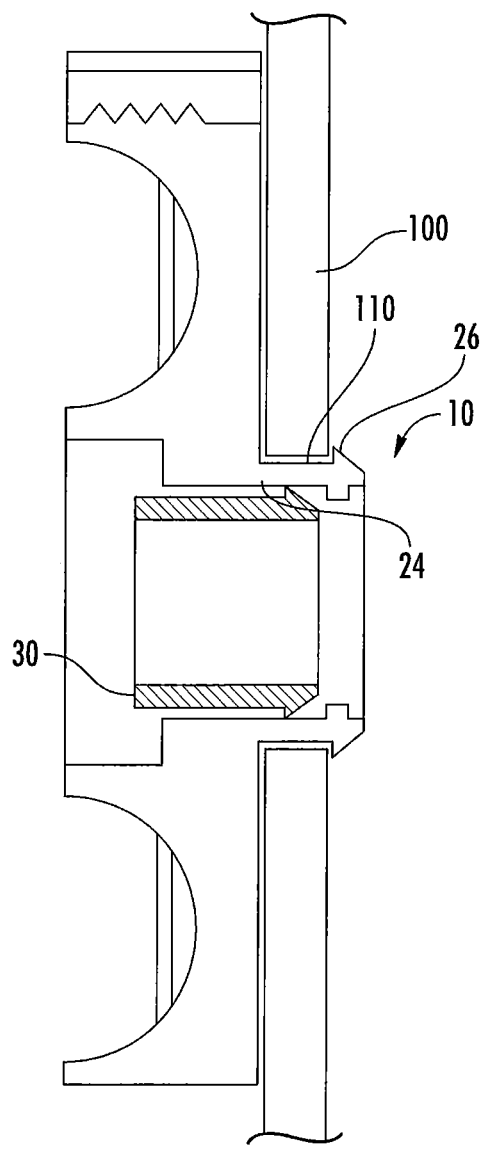
FIG. 4 is a top view of one half of the cable hanger of FIG. 1 inserted into an antenna ladder for mounting.
Figure 5:
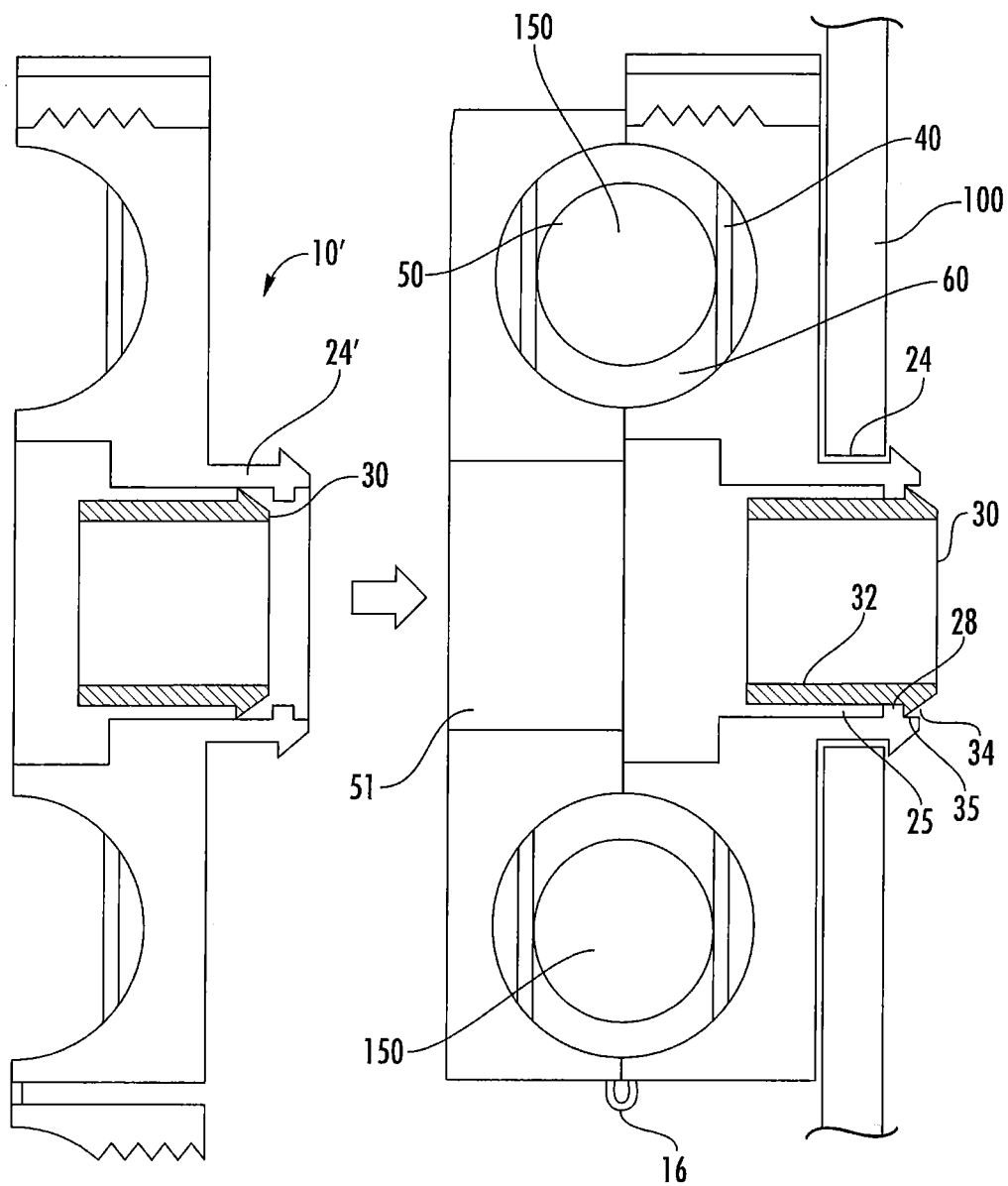
FIG. 5 is a top view of the mounted cable hanger of FIG. 4 with cables mounted therein and another cable hanger about to be mounted thereon

Use of the cable hanger 10 is illustrated in FIGS. 3-5. FIG. 3 shows that the half 14 is pivoted from its open position in FIGS. 1 and 2 about the living hinge 16 to mate with the half 12. Upon pivoting, the recesses 38 of the half 12 align with the recesses 48 to form pockets 60 that capture cables 150. The ratchet strap 52 of the half 14 is inserted into the slot 42 of the half 12; the teeth 54 of the ratchet strap 52 intermesh with the teeth 44 in the slot 42 to prevent release of the ratchet strap 52 from the slot 42, thereby securing the half 14 to the half 12 in a closed position. The ratchet strap 52 is pulled into the slot 42 to tighten the halves 12, 14 until cables 150 are snugly held in the pockets 60 (see FIG. 5). The presence of the flex sections 40, 50 enable the cable hanger 10 to accommodate different sizes of cables, as does the ability of the ratchet strap 52 to secure the halves 12, 14 in slightly different relative positions.

Referring now to FIGS. 4 and 5, it can be seen that the cable hanger 10 can be mounted on a structure, such as an cable ladder 100 or antenna tower, within holes already present in the ladder 100. In many instances (particularly in the U.S.) cable ladders and antenna towers have multiple pre-formed holes that are ¾ inch in diameter and spaced apart at 3 foot intervals. The latch 24 is inserted into a desired hole 110 in the ladder 100 such that the hook 26 of the latch 24 engages the interior surface of the ladder 100. The plunger 30 is then pushed (with a tool or the like) deeper into the bore 25, which breaks the plunger 30 away from the breakaway tabs 32. The bearing surface 34 of the plunger 30 engages the ledge 28 of the latch 24 to force the latch 24 radially outwardly, then the hooks 35 engage the far edge of the ledge 28 to firmly secure the latch 24 in place in the hole 110 (see FIG. 5).

Referring still to FIG. 5, once one cable hanger 10 has been mounted in place, additional cable hangers 10' can be mounted to the first cable hanger 10. The latch 24' on the second cable hanger 10' can be inserted into the bore 51 of the first cable hanger 10 in the manner described above. Additional cable hangers 10' can then be mounted in stacked relationship in the same manner.

Figure 6:
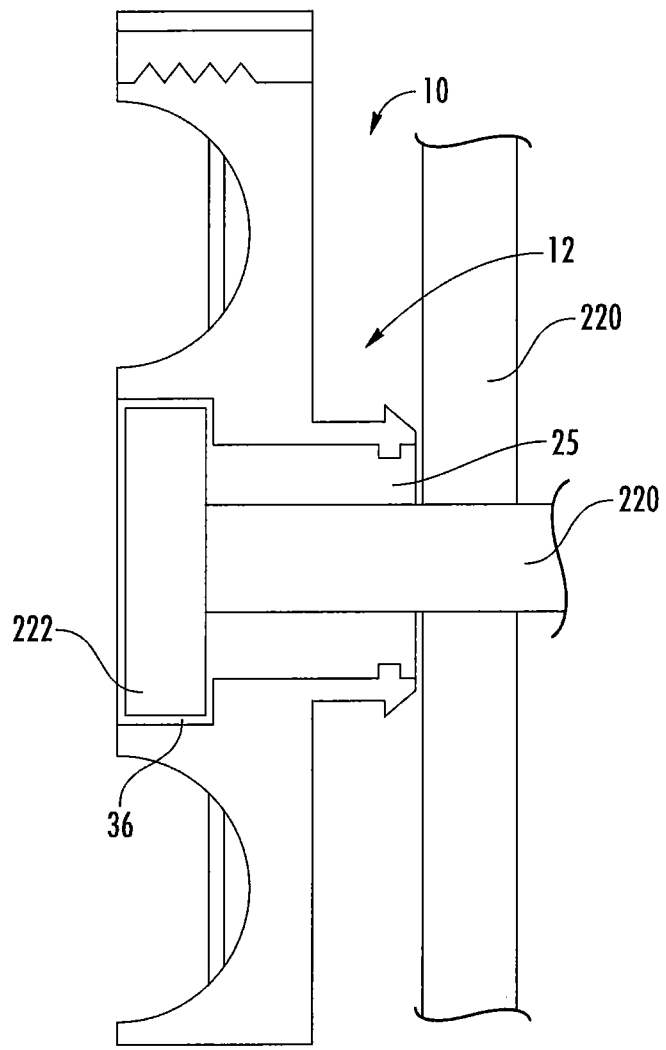
FIG. 6 is a top view of the cable hanger of FIG. 4 mounted to a structure without pre-formed holes.

Notably, the first cable hanger 10 can also be mounted to a structure that has no pre-formed holes in which the latch 24 can fit. In such an instance (as shown in FIG. 6), an appropriately-sized bolt 220 may be inserted into a hole (pre-formed or formed on-site) after being inserted through the bore 25 and the plunger (not shown in FIG. 6) in the half 12 of a first cable hanger 10. The head 222 of the bolt 220 is received in the counterbore 36. Once the first cable hanger 10 is mounted onto the structure, additional cable hangers 10' may be mounted thereto as described above.

Those skilled in this art will appreciate that the cable hanger 10 may take different forms. For example, the living hinge 16 may be replaced with a hinge of a different variety, or the halves 12, 14 may be formed as separate pieces. In the illustrated embodiment, the cable hanger 10 is configured to hang two cables, but it may be modified to hang only a single cable or more than two cables. The latch 24 and bore 51 may be configured differently (for example, the mounting latch may have two straight arms, rather than the curved configuration shown, and the bore may be square or rectangular to accommodate the straight-armed latch). Also, the plunger 30 may be omitted in some embodiments. Further, the halves may be secured with features other than a ratchet strap and toothed slot; for example, screws, bolts, VELCRO® material or the like may be employed to mate the halves together. Other configurations may also be employed.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable hanger, comprising:
 a first half including a main body with a first cable recess, a latch adapted for mounting to a mounting structure, and a first securing feature;
 a second half including a main body with a second cable recess, a bore adapted for receiving a latch of a second cable hanger, and a second securing feature;
 wherein the first half is mated with the second half such that the first and second cable recesses form a pocket for receiving and grasping a cable, and wherein the first and second securing features engage to maintain the first half and the second half in a mated condition; and
 wherein the first half and the second half are connected via a hinge; and
 wherein the main body of the first half includes a bore that is coaxial with the latch; and
 wherein the cable hanger further comprises a plunger, the plunger configured to reside in the bore of the first half and maintain the latch in a latched condition; and
 wherein the plunger is attached to the first half within the bore of the first half and configured to break away from the bore of the first half to be moved to maintain the latch in the latched condition.

2. The cable hanger defined in claim 1, in combination with a cable captured in the pocket.

3. The cable hanger defined in claim 1, mounted on one of a cable ladder or an antenna tower.

4. The cable hanger defined in claim 1, comprising a polymeric material.

5. The cable hanger defined in claim 1, formed as a monolithic component.

6. The cable hanger defined in claim 1, wherein the first half comprises two first cable recesses and the second half comprises two second cable recesses.

7. The cable hanger defined in claim 1, wherein at least one of the first and second cable recesses includes a flex member configured to grasp a cable in the cable recess.

8. The cable hanger defined in claim 1, wherein the latch is sized for mounting in a ¾ inch diameter hole.

9. A cable hanger, comprising:
 a first half including a main body with a first cable recess, a latch adapted for mounting to a mounting structure, and a first securing feature;
 a second half including a main body with a second cable recess, a bore adapted for receiving a latch of a second cable hanger, and a second securing feature;
 wherein the first half is mated with the second half such that the first and second cable recesses form a pocket for receiving and grasping a cable, and wherein the first and second securing features engage to maintain the first half and the second half in a mated condition; and
 wherein the first half and the second half are connected via a hinge; and
 wherein the main body of the first half includes a bore that is coaxial with the latch; and
 wherein the cable hanger further comprises a hollow plunger, the plunger configured to reside in the bore of the first half and maintain the latch in a latched condition; and
 wherein the plunger is attached to the first half within the bore of the first half and configured to break away from the bore of the first half to be moved to maintain the latch in the latched condition.

10. A cable hanger assembly, comprising:
 a first cable hanger and a second cable hanger, each of the first and second cable hangers comprising:
  a first half including a main body with a first cable recess, a latch adapted for mounting to a mounting structure, and a first securing feature; and
  a second half including a main body with a second cable recess, a bore adapted for receiving a latch of a second cable hanger, and a second securing feature,
  wherein the first half is mated with the second half such that the first and second cable recesses form a pocket for receiving and grasping a cable, and wherein the first and second securing features engage to maintain the first half and the second half in a mated condition, and
  wherein the first half and the second half are connected via a hinge, and
  wherein the main body of the first half includes a bore that is coaxial with the latch, and
  wherein the cable hanger further comprises a hollow plunger, the plunger configured to reside in the bore of the first half and maintain the latch in a latched condition, and
  wherein the plunger is attached to the first half within the bore of the first half and configured to break away from the bore of the first half to be moved to maintain the latch in the latched condition,
 wherein the latch of the second cable hanger is inserted into the bore of the first cable hanger such that the second cable hanger is mounted to the first cable hanger.

\* \* \* \* \*